United States Patent
Kim et al.

(10) Patent No.: US 11,172,141 B2
(45) Date of Patent: Nov. 9, 2021

(54) METHOD AND APPARATUS FOR COMPOSING IMAGES OF CELESTIAL BODIES

(71) Applicant: Haechitech Corporation, Cheongju-si (KR)

(72) Inventors: Yeon Kyu Kim, Sejong-si (KR); Yong Ho Nam, Seoul (KR); Hyun Il Chang, Seoul (KR); Seong Min Choe, Seongnam-si (KR)

(73) Assignee: HAECHITECH CORPORATION, Cheongju-si (KR)

( * ) Notice: Subject to any disclaimer, the term of this patent is extended or adjusted under 35 U.S.C. 154(b) by 0 days.

(21) Appl. No.: 16/864,742

(22) Filed: May 1, 2020

(65) Prior Publication Data

US 2021/0067678 A1    Mar. 4, 2021

(30) Foreign Application Priority Data

Aug. 28, 2019  (KR) .................. 10-2019-0105929
Mar. 13, 2020  (KR) .................. 10-2020-0031485

(51) Int. Cl.
*H04N 5/235*  (2006.01)
*H04N 5/225*  (2006.01)

(52) U.S. Cl.
CPC ......... *H04N 5/2356* (2013.01); *H04N 5/2257* (2013.01); *H04N 5/2258* (2013.01); *H04N 5/2353* (2013.01)

(58) Field of Classification Search
CPC .. H04N 5/2356; H04N 5/2257; H04N 5/2258; H04N 5/2353; H04N 5/232; H04N 5/23232; H04N 5/265; G06T 5/50; G06T 11/60; G06T 2207/20221; G01S 19/01; G01C 17/02; G01P 15/003; G01P 15/14
See application file for complete search history.

(56) References Cited

U.S. PATENT DOCUMENTS

| | | | |
|---|---|---|---|
| 10,506,172 B2 * | 12/2019 | Welker | H04N 5/23206 |
| 10,824,923 B1 * | 11/2020 | Forster | G06K 9/6256 |
| 2016/0191820 A1 * | 6/2016 | Iwasaki | H04N 5/35536 |
| | | | 348/169 |
| 2018/0352137 A1 * | 12/2018 | St. Clair | H04N 7/183 |

FOREIGN PATENT DOCUMENTS

KR   10-0531872   12/2004

* cited by examiner

*Primary Examiner* — Gevell V Selby
(74) *Attorney, Agent, or Firm* — Kile Park Reed & Houtteman PLLC (57) ABSTRACT

Disclosed are a method and apparatus for composing a plurality of images of the celestial bodies. The method and apparatus can compose a plurality of images using various pieces of information associated with the plurality of images and a time interval during the plurality of images are taken, such that objects are accurately matched with no afterimage.

4 Claims, 7 Drawing Sheets

2019.06.03. 21:09:22   2019.06.03. 21:11:22   Simple composition result: mismatched

Fig. 3

2019.06.03. 21:09:22        2019.06.03. 21:11:22        Composition result obtained by calculating movement of star

METHOD AND APPARATUS FOR COMPOSING IMAGES OF CELESTIAL BODIES

BACKGROUND

1. Technical Field

The present disclosure relates to a method and apparatus for composing a plurality of images of celestial bodies, and more particularly, to a method and apparatus which can take a plurality of images of celestial bodies in the night sky, and compose the taken images based on calculation information on the moving directions of the celestial bodies, thereby acquiring a clear celestial image.

2. Related Art

There are innumerable stars in the night sky. However, since most of the stars have low brightness, a lot of stars are not actually seen with the eyes. Thus, it is difficult to normally shoot stars in the night sky in the auto shooting mode of a general digital camera or smart phone camera on the market. Therefore, a user generally shoots stars in the night sky by adjusting the time during which starlight is exposed to the camera, using a manual shooting mode of the general digital camera or smart phone camera.

Figure 1:
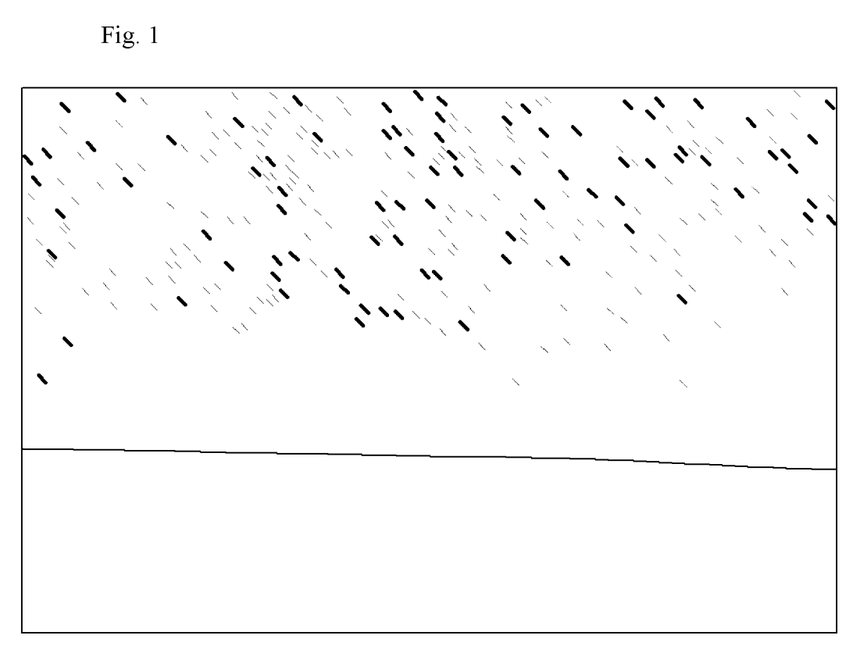
FIG. 1 includes a photograph image showing an afterimage which occurs when a long exposure time is applied to shoot stars in the night sky and a diagram obtained by schematizing the photograph.

However, when a long exposure time of the camera is applied to shoot stars in the night sky, afterimages (trails) of the stars may remain on a photograph as shown in FIG. 1. This is because the stars are not fixed but move during the exposure time due to the rotation of the earth, while objects on the ground are fixed on the photograph. Except the case in which a photographer intentionally wants an afterimage on the photograph, such an afterimage effect of the stars serves as an obstacle factor that makes it difficult to take a clear image of the stars in the night sky. For reference, FIG. 1 includes a photograph and a diagram obtained by schematizing the photograph in consideration of a reduction in resolution during a conversion operation in a specification submission process. Therefore, the meaning of the photograph can be more easily understood.

Figure 2:
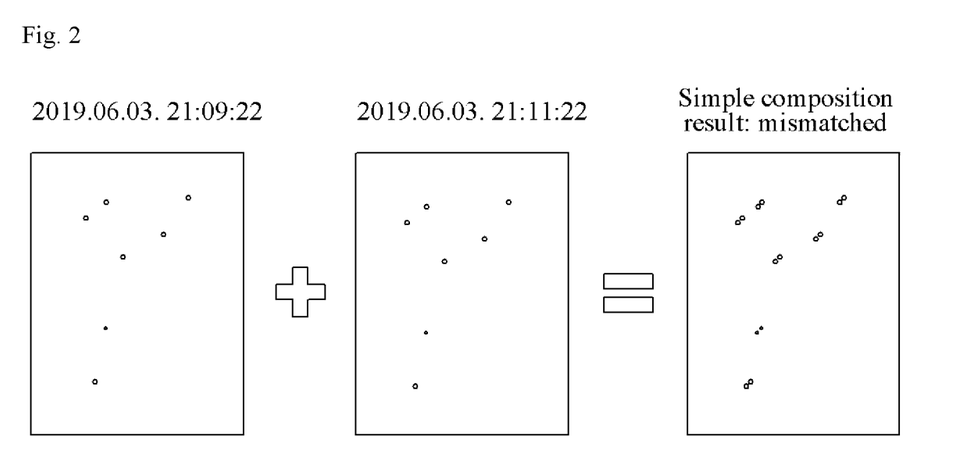
FIG. 2 includes a photograph image showing a problem which occurs when two photographs taken with time intervals are simply composed, and a diagram obtained by schematizing the photograph.

It is known that the exposure time of a camera needs to be set to about 15 seconds or less, in order to minimize an afterimage caused by the rotation of the earth. However, the exposure time of 15 seconds or less makes it difficult to acquire a photograph having such brightness that can be sufficiently recognized by human. In order to acquire an astrophotograph with sufficient brightness, a plurality of photographs with an exposure time of 15 seconds or less, for example, two photographs, may be simply taken and composed. However, although a photograph with sufficient brightness is obtained as the result of composing two photographs, the locations of the stars may be mismatched as illustrated in FIG. 2, because the celestial sphere rotates while the two photographs are taken. For reference, FIG. 2 shows a photograph obtained by simply composing a night sky photograph taken at 21:09 on Jun. 3, 2019 and a night sky photograph taken at 21:11 on the same day. Furthermore, FIG. 2 also includes a photograph and a diagram obtained by schematizing the photograph in consideration of a reduction in resolution during a conversion operation in a specification submission process. Therefore, the meaning of the photograph can be more easily understood.

According to a conventional method for solving the problem illustrated in FIG. 2, the locations of a star which brightly appears on the photographs are defined as specific points, the moving distance between the specific points is established as a relational expression, and the locations of the specific points are matched with each other through the relational expression, in order to composite two photographs. However, this method requires a long processing time and a large memory capacity to calculate the specific points on pixels, which makes it difficult to apply the method to mobile devices. Particularly, in this day and age in which the resolutions of cameras have rapidly developed, such a disadvantage in terms of computing power consumption more remarkably occurs in a mobile device using a battery.

As another method for solving such a problem, photographic assistant equipment such as an equatorial telescope or star tracker is used.

When the equatorial telescope or star tracker is coupled to a camera, the camera is rotated in response to the moving direction and path of the celestial bodies by the equatorial telescope or star tracker. Therefore, a photographer can acquire a photograph of the celestial bodies without an afterimage.

However, since this method costs a lot of money for the equatorial telescope or star tracker, an ordinary person, not a professional photographer, inevitably bears a great expense to take a photograph of the celestial bodies.

Therefore, a method capable of obtaining a high-quality celestial image using software is more useful than the physical method using expensive photographic assistant equipment, when the method is applied to a mobile device or the like.

RELATED ART DOCUMENT

Patent Document (Patent Document 1) Korean Patent No. 10-0531872

SUMMARY

Various embodiments are directed to a method and apparatus for composing a plurality of images of celestial bodies, which can acquire a clear celestial image by composing a plurality of photographs taken with an exposure time which is not excessively long.

In an embodiment, a method for composing a plurality of images of the celestial bodies may include: taking a plurality of images of the celestial bodies using a camera including a sensor; calculating the moving direction of the celestial bodies based on sensor information obtained from the sensor; and composing the taken images based on the calculation.

The sensor information may include at least one selected from the group consisting of location information measured through GPS, magnetometer information measured through a magnetometer, acceleration information measured through an accelerometer, and angular momentum information measured through a gyroscope.

In an embodiment, there is provided a computer readable recording medium in which a program for executing the method is stored.

In an embodiment, an apparatus for composing a plurality of images of the celestial bodies may include: a camera including a sensor and configured to take images of the celestial bodies; a processor configured to calculate the moving direction of the celestial bodies based on sensor information obtained from the sensor, and compose the taken images based on the calculation; and a storage unit configured to store the taken images and the composed image.

In an embodiment, there is provided a method for composing a plurality of images of the celestial bodies using a camera or a device including a camera. The method may include: acquiring a first image by shooting the celestial bodies for the first time; acquiring a second image by shooting the celestial bodies for the second time with a predetermined time interval after the first shooting; deciding an adjustment value using image information obtained when the first image is acquired and image information obtained when the second image is acquired; and composing the first and second images by moving one of the first and second images based on the decided adjustment value.

In an embodiment, an apparatus for composing a plurality of images of the celestial bodies may include: a camera configured to take images of an object; a storage unit configured to acquire a first image of the object and image information associated with the first image, using the camera, and store the first image and the image information; the storage unit configured to acquire a second image of the object and image information associated with the second image, using the camera, and store the first image and the image information; and a processor configured to calculate a value for adjusting one of the two images using the first image information and the second image information, and compose the two images based on the adjustment value.

In accordance with the embodiment of the present disclosure, the method and apparatus for composing a plurality of images of the celestial bodies can acquire a clear celestial image by composing a plurality of photographs taken with an exposure time which is not excessively long. Furthermore, when the method and apparatus in accordance with the embodiment of the present disclosure are used, even an ordinary person who does not have expensive photographic assistant equipment can acquire a beautiful celestial photograph using a shooting device such as his/her smart phone.

DETAILED DESCRIPTION

The present disclosure can be modified in various manners and embodied in various manners, and specific embodiments will be illustrated in the drawings and described in detail in the detailed description. However, the present disclosure is not limited to the specific embodiments, but may include all modifications, equivalents and substitutions without departing from the technical spirit and scope of the present disclosure. In describing the present disclosure, detailed descriptions for related publicly-known functions or configurations will be ruled out in order not to unnecessarily obscure subject matters of the present disclosure.

The terms such as first and second may be used to describe various elements, but the elements should not be limited by the terms. The terms are used only to distinguish one element from another element.

The terms used in the present disclosure are only used to describe a specific embodiment, and not intended to limit the present disclosure. The terms of a singular form may include plural forms unless referred to the contrary. In this specification, it should be understood that the meaning of "include" or "have" specifies a property, a number, a step, a process, an element, a component, or combinations thereof, but does not exclude in advance one or more other properties, numbers, steps, processes, elements, components, or combinations thereof.

Throughout this specification, it should be noted that the description may be made based on the rotation of the celestial sphere instead of the rotation of the earth, in some cases. This is not because the rotation of the celestial sphere is a scientific fact, but because when the description is made under the supposition that the rotation of the earth and the rotation of the celestial sphere have an equivalent relation, it is more intuitive and easier to understand the description.

Furthermore, it should be noted that an expression of 'knowing' data or information or 'known value' means that the data or information is recorded or stored in an apparatus in accordance with an embodiment of the present disclosure, and does not mean that the data or information is memorized by human, the data or information including a latitude value, values read from various sensors, and numerical values or units indicating exposure or specification information of a camera, which will be described below.

Therefore, the spirit of the present disclosure is not limited to embodiments described below, but the claims described below and all equivalents or equivalent modifications to the claims may belong to the scope of the present disclosure.

Hereafter, a method for composing a plurality of photograph images of celestial bodies in accordance with an embodiment of the present disclosure will be described as follows.

Figure 3:
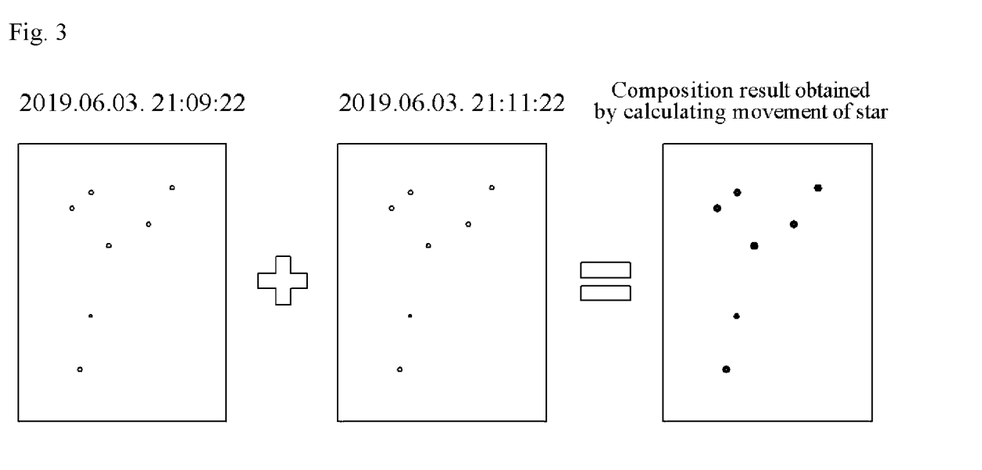
FIG. 3 includes a photograph image obtained by composing two photographs in accordance with an embodiment of the present disclosure and a diagram obtained by schematizing the photograph.

First, as described above, the final goal of the present disclosure is to obtain a composite photograph in which starlights are not mismatched or no afterimage remains as illustrated in FIG. 3, without consuming much computing power. For reference, FIG. 3 shows a photograph obtained by composing a night sky photograph taken at 21:09 on Jun. 3, 2019 and a night sky photograph taken at 21:11 on the same day through the method in accordance with the embodiment of the present disclosure. Furthermore, FIG. 3 also includes a photograph and a diagram obtained by schematizing the photograph in consideration of a reduction in resolution during a conversion operation in a specification submission process. Therefore, the meaning of the photograph can be more easily understood.

Information required for accomplishing the purpose of the present disclosure includes at least one of values obtained through devices described below, and most of the devices are mounted in recent mobile devices.

Latitude value of GPS

Data (ax, ay, az) of accelerometer

Data (mx, my, mz) of magnetometer

Data (gyrox, gyroy, gyroz) of gyroscope

Specification information of camera

Two or more night sky photographs taken with exposure time of less than 15 seconds and timestamps of photographs The GPS (Global Positioning System) mounted on a mobile device or the like may know the longitude coordinate value and the latitude coordinate value at which a photographer carrying the mobile device is located. Considering the rotation of the celestial sphere, the latitude value is particularly useful.

Figure 4:
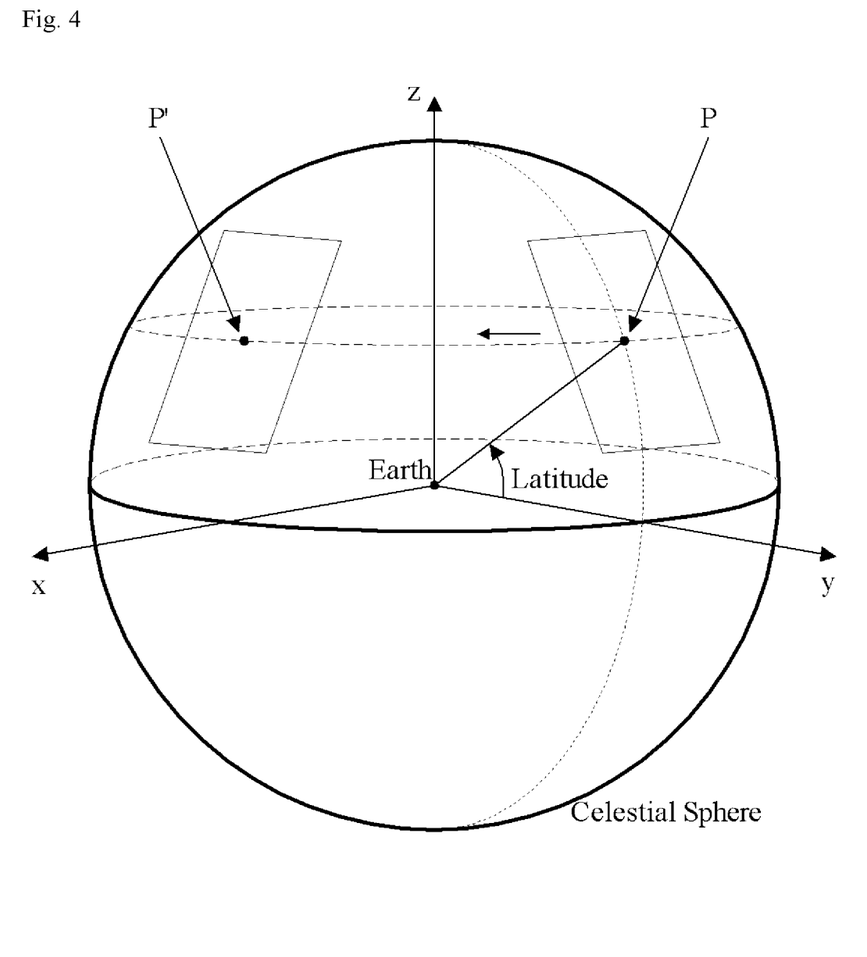
FIG. 4 is a diagram for describing the rotation of the celestial sphere while two astrophotographs are taken.

When the photographer intends to take a photograph of celestial bodies with a camera or a mobile device including a camera, the photographer sets the camera to face a desired direction. This operation changes the azimuth to the direction seen by the camera. Values measured from an accelerometer, a magnetometer and a gyroscope, which are mounted on the camera or the mobile device including a camera, are read to calculate a change in azimuth just before a first photograph is taken. In FIG. 4, a center point seen by the camera to take the first photograph is represented by P. For convenience of description, FIG. 4 illustrates that the earth is located at the center point of the celestial sphere. A rectangle including the point P indicates a photograph taken in one frame of the camera. The corner coordinates of the rectangle are previously decided by the point P, the physical specification of the camera, and other shooting conditions such as magnification and exposure, which are set by the photographer within the physical specification.

When the photographer takes a second photograph with a time interval, the celestial sphere rotates during the time interval, even though the camera is fixed. Therefore, the center point seen by the camera moves to the location of a point P' along the longitude line. In FIG. 4, the rotation amount of the celestial sphere during the time interval in which the photographs are taken are slightly exaggerated for convenience of description. The time interval between the points P and P' is easily calculated because the timestamps are accurately recorded in log files of the respective photographs. Since the celestial sphere will rotate by 360 degrees for 24 hours, the angle between the points P and P', by which the celestial sphere rotates, may also be easily calculated when the time interval is known.

As such, when the photographer takes a photograph, the camera or the device including a camera acquires various pieces of information, i.e. image information, as well as an image of the photograph. The image information may include the above-described azimuth, data extracted from various sensors, various coordinates associated with the image, a timestamp and exposure time, and unique physical characteristics of the camera, such as a focal distance, the size of a lens or the number of lenses.

Since a photograph is implemented on a two-dimensional plane, the locations of a celestial body such as a star on the two photographs are separated from each other due to the rotation of the celestial sphere. In order to compose the two photographs such that the same stars at the mismatched locations on the two photographs accurately overlap each other, the separation distance between the locations needs to be known. The separation distance, i.e. the distance between the points P and P', may be calculated through a publicly known rotation matrix.

Figure 5:
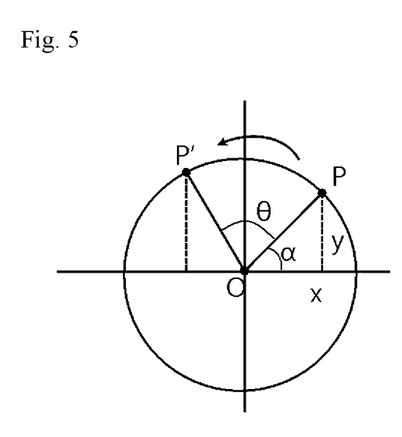
FIG. 5 is a diagram for describing a rotation matrix.

As illustrated in FIG. 5, the rotation matrix is a method capable of calculating the coordinate of the point P' when the point P rotates and changes to the point P'. At this time, the coordinate (x, y) and the angle a of the point P may be known or calculated from GPS information and data of the accelerometer, the magnetometer, the gyroscope and the like, when the first photograph is taken. The rotation angle a to the point P' may be calculated from the time interval between the moment that the first photograph is taken and the moment that the second photograph is taken. Therefore, the rotation matrix may be used to calculate the coordinate (x',y') of the point P' corresponding to a new point through Equation 1 below.

$$\begin{pmatrix} \cos\theta & -\sin\theta \\ \sin\theta & \cos\theta \end{pmatrix} \begin{pmatrix} x \\ y \end{pmatrix} = \begin{pmatrix} x' \\ y' \end{pmatrix} \qquad \text{[Equation 1]}$$

Such transformation may be applied to the corner coordinates of the photograph as well as the point P', in order to newly calculate the corner coordinates of the second photograph. Based on the coordinate of the point P', calculated through this method, the distance of one image of the two photograph images may be adjusted to compose the two photographs. Then, the composite photograph has an accurately adjusted image with no afterimage.

Hereafter, an apparatus for composing a plurality of photograph images of celestial bodies in accordance with an embodiment of the present disclosure will be described as follows.

Figure 6:
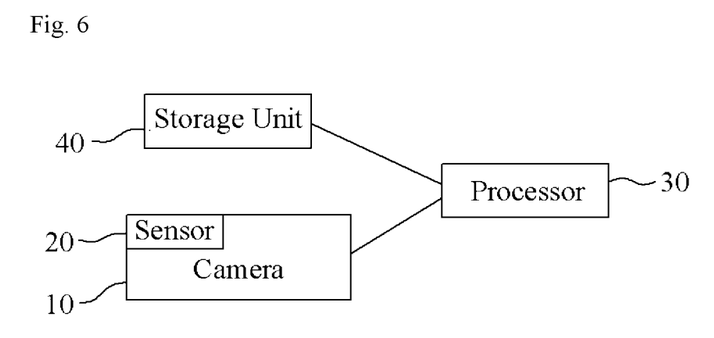
FIG. 6 is a diagram schematically illustrating an apparatus in accordance with an embodiment of the present disclosure.

FIG. 6 is a diagram illustrating an apparatus for composing a plurality of images of celestial bodies in accordance with an embodiment of the present disclosure.

Referring to FIG. 6, the apparatus in accordance with the embodiment of the present disclosure may include a camera 10, a sensor 20, a processor 30 and a storage unit 40. The apparatus in accordance with the embodiment of the present disclosure may further include a display unit (not illustrated).

The camera 10 takes a plurality of images of the celestial bodies as described above. At this time, the camera 10 may include a general digital camera 10, a camera 10 built in a mobile terminal or a camera 10 for astronomical observation.

The camera 10 may include some or all of a lens, a lens driver, an iris, an iris driver, an imaging device and an imaging device controller.

The lens may include multiple groups or sheets of lenses. The location of the lens is adjusted by the lens driver. The lens driver adjusts the location of the lens according to a control signal.

An optical signal having transmitted the lens and the iris forms an image of an object at a light receiving surface of the imaging device. The imaging device may be a CCD (Charge Coupled Device) sensor or CIS (Complementary Metal Oxide Semiconductor Image Sensor) for converting an optical signal into an electrical signal.

The sensor 20 may include a GPS sensor, a magnetometer, an accelerometer, a gyroscope and the like, and be included in the camera 10 or a mobile device including a camera.

The processor 30 may calculate the movements of the celestial bodies based on the sensing information measured through the sensor 20. The processor 30 may compose the plurality of images which are taken based on the calculation information.

The processor 30 may drive an operating system or application program, for example, to control a plurality of hardware or software components connected to the processor 30, and perform various data processing and computing operations. The processor 30 may be implemented as SoC (System on Chip), and indicate a GPU (Graphics Processing Unit) and/or an image signal processor 30 or include one or both of the GPU and the image signal processor 30.

The storage unit 40 may store sensor information measured by the sensor 20. The storage unit 40 may store the plurality of images taken by the camera 10. The storage unit 40 may store the information obtained by calculating the movements of the celestial bodies through the processor 30, and store the image composed by the processor 30.

The storage unit 40 may include an internal memory or external memory, for example.

The internal memory may include at least one of a volatile memory (for example, DRAM (Dynamic RAM), SRAM (Static RAM) or SDRAM (Synchronous Dynamic RAM)), a nonvolatile memory (for example, OTPROM (One Time Programmable ROM), PROM (Programmable ROM), EPROM (Erasable and Programmable ROM) and EEPROM (Electrically Erasable and Programmable ROM)), a mask ROM, a flash ROM, a flash memory (for example, NAND flash or NOR flash), a hard drive and an SSD (Solid State Drive).

The external memory may further include a flash drive, for example, a CF (Compact Flash), SD (Secure Digital), Micro-SD (Micro Secure Digital), Mini-SD (Mini Secure Digital), xD(extreme Digital), MMC (Multi-Media Card) or memory stick.

The display unit (not illustrated) may display an image taken by the camera 10, the movements of the celestial bodies, calculated by the processor 30, an image composed by the processor 30, or images stored in the storage unit 40.

The display unit (not illustrated) may include a panel, a hologram device or a projector, and be implemented with a flexible, transparent or wearable structure.

The display unit (not illustrated) may further include a control circuit for controlling a panel, a hologram device or a projector.

Figure 7:
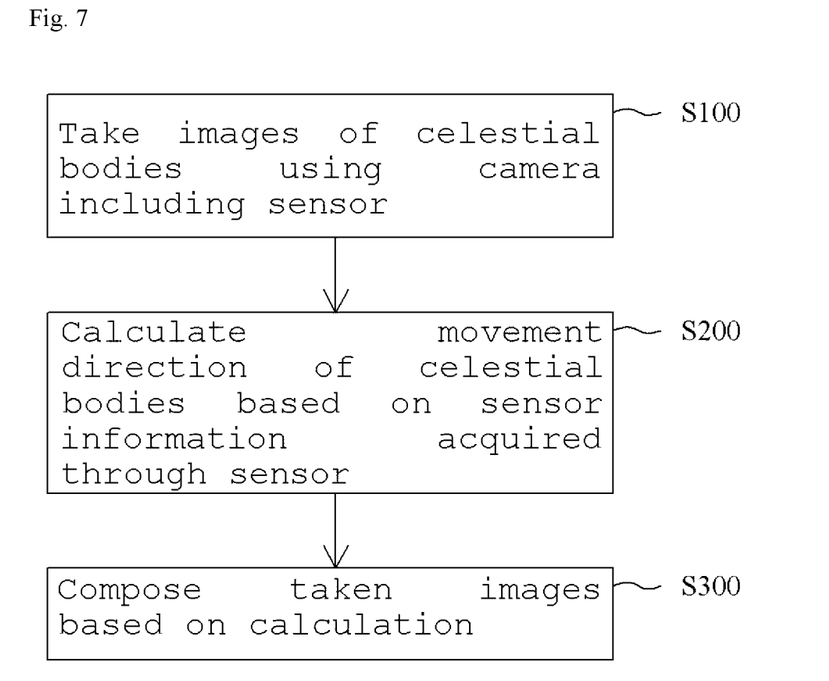
FIG. 7 is a diagram for describing a photograph composing method in accordance with an embodiment of the present disclosure.

An image composing method in accordance with an embodiment of the present disclosure will be described with reference to FIG. 7. The image composing method may include taking a plurality of images of the celestial bodies using the camera 10 including the sensor 20 in step S100, calculating the moving direction of the celestial bodies based on sensor information acquired through the sensor 20 in step S200, and composing the taken images based on the calculation in step S300.

At this time, the sensor 20 may include a GPS sensor, a magnetometer, an accelerometer, a gyroscope and the like. The sensor information may indicate information measured through the sensor 20.

The camera 10 used in the taking of the plurality of images using the camera 10 including the sensor 20 in step S100 may be a camera for a mobile terminal. In this case, the taking of the plurality of images in step S100 may include driving a shooting application in a mobile terminal in step S110, fixing the camera built in the mobile terminal in the direction in which a photographer intends to shoot in the night sky in step S120, and taking images of the celestial bodies in the night sky by pressing a shooting button on the shooting application, in step S130.

The sensor information obtained from the sensor 20 may include at least one selected from the group consisting of location information measured through GPS, magnetometer information measured through the magnetometer, acceleration information measured through the accelerometer, and angular momentum information measured through the gyroscope.

The composing of the taken images in step S300, based on the calculation of the above-described rotation matrix, performs a computing operation which is less complicated than a general method that finds feature points of images and composes the images based on the feature points. Thus, the method exhibits a high processing speed.

The method for composing a plurality of images of the celestial bodies in accordance with the embodiment of the present disclosure may be stored in a recording medium which can be read by a server computer. Such a recording medium include all types of recording media in which program and data are stored so as to be read by a computer system. For example, the recording medium includes a ROM, RAM, CD (Compact Disk), DVD (Digital Video Disk)-ROM, magnetic tape, floppy disk, optical data storage device and the like, and may be implemented in the form of a carrier wave (for example, transmission through the Internet). Furthermore, such recording media may be may be distributed into computer systems connected through a network, and store and execute codes which can be read by computers in a distributed manner.

So far, the preferred embodiments of the present disclosure have been described. Those skilled in the art to which the present disclosure pertains can understand that the present disclosure can be modified without departing from the essential characteristics of the present disclosure. Therefore, the disclosed embodiments need to be considered from a descriptive viewpoint, no a limitative viewpoint. It should be construed that the scope of the present disclosure is defined in the claims, not the descriptions of the disclosure, and all differences within the same scope are included in the present disclosure.

What is claimed is:

1. A method for composing a plurality of images of the celestial bodies using a camera or a device including a camera, the method comprising:
   acquiring a first image by shooting the celestial bodies for the first time;
   acquiring a second image by shooting the celestial bodies for the second time with a predetermined time interval after the first shooting;
   deciding an adjustment value using image information obtained when the first image is acquired and image information obtained when the second image is acquired; and
   composing the first and second images by moved one of the first and second images based on the decided adjustment value,
   wherein the image information obtained when the first image is acquired and the image information obtained when the second image is acquired comprise a timestamp, an exposure time, vertex coordinates of a frame forming an image, and some or all values extrated from a GPS, a magnetometer, an accelerometer and a gyroscope.

2. A method for composing a plurality of images of the celestial bodies using a camera or a device including a camera, the method comprising:
   acquiring a first image by shooting the celestial bodies for the first time;
   acquiring a second image by shooting the celestial bodies for the second time with a predetermined time interval after the first shooting;

deciding an adjustment value using information obtained when the first image is acquired and image information obtained when the second image is acquired; and composing the first and second images by the moving one of the first and second images based of the decided adjustment value, wherein the deciding of the adjustment value uses a rotation matrix.

3. An apparatus for composing a plurality of images of the celestial bodies, comprising:

a camera configured to take images of an object, storage unit configured to acquire a first image of the object and image information associate with the first image, using the camera, and store the first image and the image information;

the storage unit configured to acquire a second image of the object and image information associated with the second image, using the camera, and store the first image and the image information; and a processor configured to calculate a value for adjusting one of the two images using the first image information and the second image information, and compose the two images based on the adjustment value, wherein each of the first information and the second image information comprises an azimuth, a timestamp, an exposure time, vertez coordinatess of a frame forming an image, and some or all of values extracted from a GPS, a magnetometer, an accelerometer and a gyroscope.

4. An apparatus for composing a plurality of images of the celestial bodies, comprising:

a camera configured to take images of aan object;

a storage unit configured to acquire a first image of the object and image information associated with the first image, using the camera, and store the first image and the image information;

the storage unit configured to acquire a second image of the object and image information associated with the second image, using the camera, and store the first image and the image information; and a processor configured to calculate a value for adjusting one of the two images using the first image information and the second image information and compose the two images based on the adjustment value, wherein the processor calculates the adjustment value using a rotation matrix.

* * * * *